May 29, 1928.
H. SMITH
1,671,614
DOOR CLOSING AND CHECKING DEVICE AND THE LIKE
Filed April 21, 1924
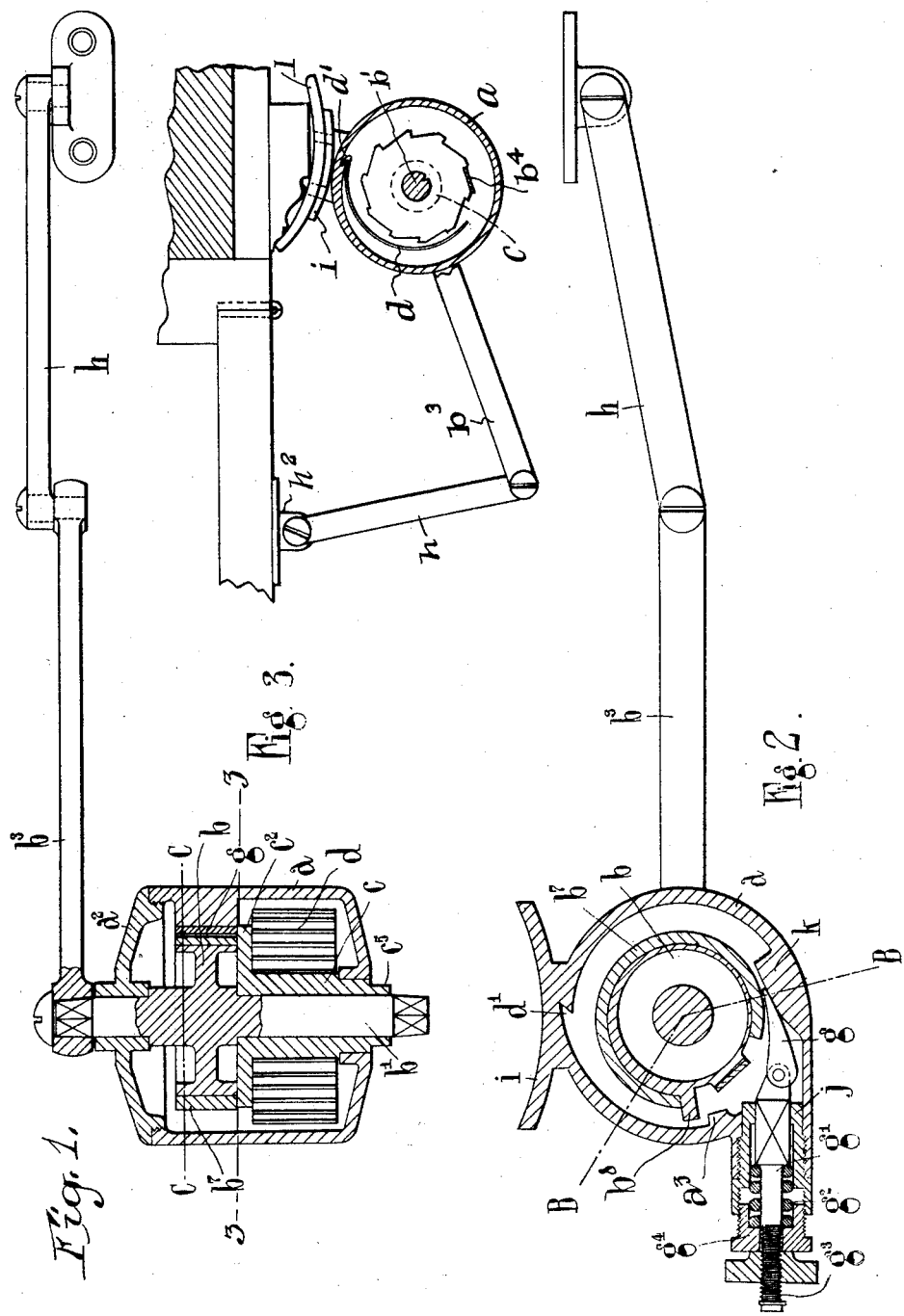

Patented May 29, 1928.

1,671,614

UNITED STATES PATENT OFFICE.

HENRY SMITH, OF LONDON, ENGLAND, ASSIGNOR TO MANHATTAN ELECTRICAL SUPPLY COMPANY, INC., OF NEW YORK, N. Y., A CORPORATION OF MASSACHUSETTS.

DOOR CLOSING AND CHECKING DEVICE AND THE LIKE.

Application filed April 21, 1924, Serial No. 708,014, and in Great Britain November 30, 1923.

This invention relates to door-closing and checking devices, more particularly of the type wherein a coil or equivalent spring acts upon a pivoted door lever adjacent its pivoting axis and wherein a brake or retarding means is provided to prevent the too rapid closing, or slamming, of the door.

An object of the invention is to provide an improved reliable device of the above character which offers little or no resistance to the opening of the door but which checks or controls the closing movement thereof as required so that it will close, or close and latch, a door quietly at a suitably slow velocity.

A further object of the invention is to provide a device which is substantially universal in its application, that is to say, one which may be fitted or applied in any one of a variety of positions, to suit the particular door it is desired the device should close.

The invention also has for its object the provision of an improved and simplified device and one which may be manufactured at a low cost.

An advantage of the invention resides in this, that it enables a device of standard size to be provided which will effectively operate upon doors of a variety of sizes or weights.

The invention consists in a device for retarding relative oscillatory movement between two parts, comprising a rotary drum having an external brake surface, a brake shoe between which and the brake surface relative oscillatory movement takes place, consisting of an elongated wedge-shaped member adapted to present an extended sliding brake surface to the drum and an abutment between which and the brake drum the brake shoe is adapted to slide, the arrangement being such that the brake shoe is automatically drawn in between the abutment and the drum into close frictional engagement with the brake drum surface so as to check the relative movement with a braking action but not so as to lock as in the case of a clutch.

Further features of the invention will be hereinafter described and pointed out in the claims.

In the accompanying drawings:—

Figure 1 is a sectional elevation of a device, according to the invention the section being taken on the line B—B of Figure 2 which is itself a sectional plan of a device as taken on the line C—C of Figure 1, and Figure 3 is a sectional plan taken on the line A—A of Figure 1 showing the device as applied to a door.

In carrying the invention into effect according to one convenient mode, a door-closing lever $b^3$ is provided with a pivot member or spindle $b'$ mounted in a suitable casing $a$ of cylindrical or other cross section and is provided with a drum $b$ or portion of increased diameter adapted to act as a support for a brake surface $b^7$ intended to co-operate with a brake shoe or element.

A volute or coil spring $d$ is mounted substantially coaxially with the pivoting axis of the door-closing lever. According to the preferred form, the spindle $b'$ of the door-closing lever $b^3$ is provided with a sleeve member $c$ to which the inner convolution of the spring is anchored, the other end being secured in any suitable manner to the casing of the device, as at $d'$.

The sleeve element may be provided with a ratchet wheel or disc $c^2$ of a substantially corresponding diameter to that of the drum $b$ above indicated. This ratchet or disc lies against the drum and serves as an adjustable means whereby the spring may be connected and caused to act upon the door-closing lever. A pawl or dog $b^4$ may be secured to the drum member, which is adapted to engage with the teeth of the ratchet.

The tension of the spring may be varied by rotating the sleeve and ratchet wheel relatively to the drum member and causing the pawl to engage other teeth on the ratchet. Suitable manipulating means may be provided externally to the casing for the purpose of adjusting the ratchet. For example, the outer end $c^5$ of the sleeve may be squared or provided with facets.

The member $b$ should be provided with a projection, such as $b^8$, adapted to engage a stop $a^3$ to limit the movement of the drum member $b$.

The door-closing lever $b^3$ may be mounted upon its pivot member, either above or below the drum above mentioned, that is to say, it may be located either at the top or at the bottom of the casing and is preferably arranged entirely outside the latter, so that the device may be completely enclosed by its casing and free from the ingress of dust or other extraneous matter. With this end in view each end of the spindle $b'$ may be shaped to receive the end of the lever $b^3$ in any one of several positions and the latter may be held in place on the end of the spindle selected by a screw $b^6$.

It is preferred that the surface of the drum $b$ should be provided with a covering $b^7$ of the substance known under the name "Ferodo". Other appropriate frictional surface material, woven or otherwise, may be employed or, if desired, the cooperating brake element or shoe may be adapted to act upon a metal surface.

The brake surface may be arranged on the arc of a circle having as its centre the pivoting axis of the door-closing lever or such may be eccentrically arranged or upon a cam surface. In either case the surface may be terminated or be inclined away from the brake shoe at a predetermined position in order to afford an automatic elimination of the braking action as and when required which may be, for example, towards the final stage in the closing of the door.

It has been found convenient to produce the above effect by mounting the friction material $b^7$ upon an eccentric or snail cam surface which is adapted to provide a greater braking action in the early stage of the closing of the door and a decreasing action as the door closes which may entirely disappear in the final closing of the door, so that the full strength of the spring comes into action.

In constructing a brake shoe or member according to the preferred form for the above described or another door-closing device having suitable characteristics, a plunger $g'$ is arranged tangentially or at an incline to a tangent to the brake surface and mounted in a suitable housing $j$ in an extension or sleeve part of the casing.

Upon the inner extremity of the plunger $g'$ a pivoted shoe or wedge-shaped element $g$ is secured so that it may possess an accommodating movement towards or away from the brake surface. The surface of the shoe towards the material $b^7$ may be covered by leather, "Ferodo" or some other suitable friction surface for cooperating with the brake surface on the drum, and may conform more or less to the curvature of the brake surface.

The plunger is provided with a portion of square cross-section or otherwise provided with means to prevent its twisting or rotation.

The outer surface of the pivoted shoe is adapted to engage an abutment or wedge member $k$ secured to or formed integral with the inner surface of the casing in such a manner that as the plunger is moved inwardly the abutment tends to thrust the pivoted shoe towards the brake surface. The plunger may be surrounded by a spring $g^2$ adapted to tend to urge it inwardly.

Means may be provided for adjusting the tension of the spring and altering the position of the brake shoe with respect to the abutment. For example, the outer end of the plunger may be screw-threaded, as at $g^3$, and engaged by a nut member, the action of which is to cause the brake shoe to be retracted against the tension of the spring or allow the shoe to be protruded nearer the brake surface under the action of the spring. One function of this screw threaded adjustment is to limit the inward movement of the brake shoe and thus to prevent the same from wedging so tightly between the brake drum and the abutment as positively to engage, or clutch the brake surface and prevent relative movement of the drum. The tension of the spring may be adjusted by providing a screw thread abutment cap $g^4$.

The arrangement of the plunger and spring is such that upon the opening movement of the door the brake surface slides over the brake shoe, tending to cause the plunger to be retracted against the resilience of the spring. As the brake shoe contacts with the braking surface and as any undue pressure which might be liable to be set up is overcome by reason of the capacity of the brake shoe to retract against its spring, the cooperating brake members offer little or no resistance to the opening of the door.

When the closing movement commences the brake shoe is immediately thrust forward by the action of the spring and wedging action is set up between the abutment $k$ and the brake surface $b^7$, the direction of movement of the latter itself tending to maintain or increase the contact.

The above brake device provides means whereby the action of the door-closing spring is controlled accurately to the required extent so that the door is firmly and silently shut. The adjustment provides for variation of control over a wide range so that any selected rate of closing may be acquired by the door, or doors of any weight or size may be provided for successfully.

The brake action is relieved immediately the brake shoe leaves the brake surface, either by the termination of the brake surface or the separation thereof from the brake shoe owing to the shape of the supporting surface of the drum.

The outer end of the door lever $b^3$ may be connected more or less directly to the door upon which it is adapted to operate by the aid of a shoe, roller or sliding member mounted upon a track or bar, so that relative movement between the end of the lever and door may be accommodated, Alternatively the end of the door lever may be connected to the door by aid of a pivotal link $h$ which, when applied to the door, resides at an angle to the door lever and appropriately transmits the closing thrust to the door continuously to the closed position.

When it is intended that a device should cause or permit the door to remain open after it has turned through a predetermined angle (for example, that corresponding to its approximately fully open situation), the lever and link should be suitably proportioned and the device should be so mounted that when the door is fully open, or open to the required degree, the link lies flat against the door upon the side of its attachment to the door remote from the pivot of the door-closing lever. In this position the point of attachment $h^2$ to the door will lie upon, adjacent or will pass over a line joining the end of the door-closing lever $b^3$ with the door hinge. If these conditions are observed it will be found that the door will remain open as the door-closing lever will fail to act upon the door through its link and will only come into operation again if an initial impetus is applied to the door itself to readjust the position of the link with respect to the lever.

The length of the door-closing lever may be adjustable by providing it in two parts one of which, for example, may have slotted engagement with the other through the aid of a set screw or other locking device. Any other suitable means may be provided for extending the effective length of the door-closing lever.

The lever is adapted to act upon the door through the medium of a link $h$ the length of which may also be adjustable.

It is preferred that the action of the spring upon the door should be that of pressure or pushing conveyed through the lever and link but such may be applied to effect the closing of the door by means of a pulling action and the device may be mounted either upon the door or upon its frame.

The casing of a device according to the invention may be circular in cross-section, or if it is desired to provide additional clearance so that the door to which it is applied may be opened to a wider angle, the bracket or plate 11 for mounting the device may be disposed asymmetrically to throw the casing further away from the door hinge or the casing may be elliptical or oval and the bracket or plate, such as 11, may be fixed to or mounted upon the casing in such a position that the major axis thereof is turned away from the door.

The brake device comprising a brake surface or shoe having the features above described may be employed in conjunction with any type of door-closing device.

As an alternative to providing a reciprocable brake shoe, one may be provided which operates with an oscillatory or partial rotary movement. For example, in place of the plunger and brake shoe illustrated in Figure 2, an eccentric member or cam may be suitably mounted upon a spindle so that it is capable of rotation and may be located in the region of the abutment 9 shown in Figure 2. The axis of the eccentric or cam should be positioned parallel with the axis of the brake surface and so that as the surface $b^7$ rotates on the opening of the door, the preponderating part of the eccentric or cam is moved away or thrust outwardly from a line joining the axis of the brake surface $b^7$ and the pivoting axis of the cam or eccentric. As the surface $b^7$ commences its return rotary movement the preponderating part of the cam or eccentric is drawn inwardly and tends to come or lie between its pivoting axis and that of the surface $b^7$, with a wedge-like action, the mounting of the cam or eccentric spindle operating as an abutment for the braking contact.

Thus it will be appreciated that as the door opens there is little or no resistance from the cam or eccentric but as the door closes the cam or eccentric shoe comes into operation and tends to engage the brake surface $b^7$ with increasing pressure.

The oscillatory movement of the cam or eccentric may be limited by suitable stops which should be adjustable in order to vary the intensity of the braking action. If desired, a coil or other spring may be applied to the eccentric cam or the spindle thereof, which tends constantly to throw the cam or eccentric into the operative position.

The devices as above described, it will be appreciated, may be applied either to a right- or left-handed door by the simple process of reversal. Similarly, it may be applied to the outside of a door to shut the same by a pulling action instead of by a pushing action as when located upon the inside of the door.

By suitably extending the pivot of the link and door lever the device may be applied above the door and may be mounted upon the lintel. Alternatively, the door lever may be made of cranked or inclined form in order to obtain a suitable engagement with the door.

For the purpose of mounting the device, the casing may have secured to it or cast integrally with it an arcuate plate $i$ which may be of suitable size to accommodate and fit the device to the usual types of architrave or moulding likely to be met with.

In order to apply the device to architraves or lintels having heavy mouldings or mouldings of an unusual character, an adaptor plate $l$ (Figure 3) may be provided to which the mounting plate *i* above mentioned is adapted to be secured in a variety of positions by screw threaded or other means.

The adaptor plate *l* may be of angular or arcuate form or of any suitable shape enabling it to bridge or seat itself upon mouldings of various characters.

Having now described my invention what I claim as new and desire to secure by Letters Patent is:—

1. A device for automatically retarding relative movement in one direction of oscillation between two parts, comprising a rotary drum adapted to rotate first in one direction and then in the other, a brake shoe, between which and the rotary drum relative oscillatory movement takes place, consisting of an elongated wedge-shaped member, an abutment surface between which and the rotary drum the brake shoe is adapted to slide, a spring normally tending to thrust the brake shoe between the rotary drum and the abutment, and means for limiting the movement of the brake shoe and preventing the same from clutching positively, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

2. A device for automatically retarding relative movement in one direction of oscillation between two parts comprising a rotary drum adapted to rotate first in one direction and then in the other, a brake shoe, between which and the drum relative oscillatory movement takes place, consisting of an elongated wedge-shaped member, an abutment surface between which and the rotary drum the brake shoe is adapted to slide, means for thrusting the brake shoe in between the abutment and the rotary drum and means for limiting the movement of the brake shoe and preventing the same from clutching positively, the arrangement being such that the brake shoe is automatically drawn in between the abutment and the rotary drum to have a retarding action thereon when the movement thereof takes place in one direction while in the other direction of oscillation the shoe is automatically pushed away against the action of the first mentioned means so that little frictional retardation takes place.

3. A device for automatically retarding relative movement in one direction of oscillation between two parts comprising a rotary drum adapted to rotate first in one direction and then in the other, a brake shoe, between which and the rotary drum relative oscillatory movement takes place, consisting of an enlongated wedge-shaped member, an abutment surface between which and the rotary drum the brake shoe is adapted to slide, a spring normally tending to thrust the brake shoe in between the abutment and the rotary drum and an adjustable stop device for limiting the inward movement of the brake shoe and preventing the brake shoe from clutching positively, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

4. A device for automatically retarding relative movement in one direction of oscillation between two parts comprising a rotary drum adapted to rotate first in one direction and then in the other, a brake shoe, between which and the rotary member relative oscillatory movement takes place, consisting of an elongated wedge-shaped member, an abutment surface between which and the rotary drum the brake shoe is adapted to slide, a plunger carrying the brake shoe and a spring operating on the plunger and normally tending to thrust the brake shoe in between the abutment and the rotary drum and an adjustable stop device associated with said plunger for limiting the inward movement of the brake shoe and preventing the brake shoe from clutching positively, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

5. A device for automatically retarding relative movement in one direction of oscillation between two parts comprising a rotary drum adapted to rotate first in one direction and then in the other, a brake shoe, between which and the rotary drum relative oscillatory movement takes place, consisting of an elongated wedge-shaped member, an abutment surface between which and the rotary drum the brake shoe is adapted to slide, a plunger carrying the brake shoe, a spring operating on the plunger and normally tending to thrust the shoe in between the abutment and the rotary drum, means for adjusting the tension of the spring and an adjustable stop device associated with said plunger for limiting the inward movement of the brake shoe and preventing the same from clutching positively, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

6. A device for automatically retarding relative movement in one direction of oscillation between two parts comprising a rotary drum adapted to rotate first in one direction and then in the other, a brake shoe, between which and the rotary drum relative oscillatory movement takes place, consisting of an elongated wedge-shaped member, an abutment surface between which and the rotary drum the brake shoe is adapted to slide, a plunger carrying the brake shoe, a spring operating on the plunger and normally tending to thrust the shoe in between the abutment and the rotary drum, an adjustable stop device associated with said plunger for limiting the inward movement of the brake shoe, a casing for the drum and shoe and an extension on the casing substantially tangential to the rotary drum for housing said plunger and spring, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

7. A device for automatically retarding relative movement in one direction of oscillation between two parts comprising a rotary drum adapted to rotate first in one direction and then in the other, a brake shoe, between which and the rotary drum relative oscillatory movement takes place, consisting of an elongated wedge-shaped member, an abutment surface between which and the rotary drum the brake shoe is adapted to slide, a plunger carrying the brake shoe, a spring operating on the plunger and normally tending to thrust the shoe in between the abutment and the rotary drum, an adjustable stop device associated with said plunger for limiting the inward movement of the brake shoe, a casing for the drum and shoe, an extension on the casing substantially tangential to the rotary drum for housing said plunger and spring, a cap on the casing extension for adjusting the tension of the spring and a nut on the plunger adapted to act as an adjustable stop in conjunction with the cap to limit the inward movement of the brake shoe, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

8. A device for automatically retarding relative movement in one direction of oscillation between the two parts comprising a rotary drum having a mutilated portion and adapted to rotate first in one direction and then in the other, a brake shoe, between which and the rotary drum relative oscillatory movement takes place, consisting of an elongated wedge-shaped member having an extended brake surface, an abutment surface between which and the rotary drum the brake shoe is adapted to slide, and a spring normally tending to thrust the brake shoe between the rotary drum and the abutment, the arrangement being such that the brake shoe is automatically drawn in between the abutment and the rotary drum to have a retarding action thereon when the movement takes place in one direction and until the mutilated portion of the drum is reached, while in the other direction of oscillation the shoe is automatically pushed away against the action of the spring so that little frictional retardation takes place.

9. A door-closing and checking device comprising a casing for the device, a rotatable drum member having an external brake surface, a door-closing torsion spring operatively connected to the drum and anchored to a fixed part, a door-closing lever operatively connected to the drum so that the latter is rotated when the door is opened, an abutment member carried by a fixed part and a brake shoe movably mounted so that it can move between the abutment and the brake surface to engage the latter with a wedge-like action frictionally to retard the movement of the drum in one direction when the door is closing and to be relieved from the retarding position when the rotation is in the other direction, on the opening of the door so that the brake surface slides comparatively lightly against the shoe.

10. A door-closing and checking device comprising a casing for the device, a rotatable drum member having an external brake surface, a door-closing torsion spring operatively connected to the drum and anchored to a fixed part, a door-closing lever, such as $b^3$, operatively connected to the drum and having a link, such as $h$, for connecting the lever to the door, an abutment member carried by a fixed part and a brake shoe movably mounted so that it can move between the abutment and the brake surface to engage the latter with a wedge-like action frictionally to retard the movement of the drum in one direction when the door is closing and to be relieved from the retarding position when the rotation is in the other direction, on the opening of the door so that the brake surface slides comparatively lightly against the shoe.

11. A door-closing and checking device comprising a casing for the device, a spindle rotatably mounted in said casing and having a drum member provided with a brake surface fixed thereto; a door-closing lever operatively connected to the spindle, a door-closing torsion spring connected to the spindle and to a fixed part, an abutment carried by the casing and arranged adjacent the brake surface and a brake shoe mounted so that it may move between the abutment and the brake surface, the arrangement being such that the shoe is adapted to be displaced in the same direction as that in which the brake surface moves when the door is opening and when it is closing whereby the shoe on the closing swing of the door frictionally engages the brake surface with a wedge-like action in between the abutment and the brake surface and during the opening of the door the brake surface slides lightly against the shoe with little or no braking action.

12. A door-closing and checking device having the features claimed in claim 9 and wherein the brake drum has a surface eccentric to the axis of rotation thereof for the purposes described.

13. A door-closing and checking device having the features claimed in claim 9 wherein the braking surface of the drum is mutilated so that the braking or retarding action of the shoe ceases when the mutilated portion of the drum arrives at the shoe.

14. A door-closing and checking device having the features claimed in claim 9 and wherein the brake drum has a surface eccentric to the axis of rotation thereof and has a mutilated portion so that the braking or retarding action of the shoe ceases when the mutilated portion of the drum arrives at the shoe.

15. A door closing and checking device having the features claimed in claim 9 and wherein the operative connection between the spring and the drum comprises a plate co-axial therewith and lying against the side thereof and a catch device extending laterally between the drum and the plate and adapted operatively to unite the two together in adjustable positions in order to impose suitable tension on the spring.

16. A door-closing and checking device having the features claimed in claim 11 and wherein the rotatable spindle extends on each side of the drum and has on one side a sleeve co-axially arranged around this part to which the inner end of the spring is attached, provided with a locking plate in the form of a ratchet lying against the side of the drum and wherein the drum is provided with a catch adapted adjustably to engage the teeth of the ratchet in any selected position.

17. A door-closing and checking device having the features claimed in claim 11 and wherein the rotatable spindle extends on each side of the drum and has on one side a sleeve co-axially arranged around this part to which the inner end of the spring is attached, provided with a locking plate in the form of a ratchet lying against the side of the drum and wherein the drum is provided with a catch adapted adjustably to engage the teeth of the ratchet in any selected position and wherein the spindle is provided at each end with means for interchangeably engaging the door-closing lever.

18. A device for automatically retarding relative movement in one direction of oscillation between two parts, comprising a rotary drum adapted to rotate first in one direction and then in the other, a brake shoe, between which and the rotary drum relative oscillatory movement takes place, consisting of an elongated wedge-shaped member, a spring normally tending to thrust the brake shoe against the rotary drum, and adjustable means for controlling the position of the wedge with respect to the drum and preventing the wedge from clutching positively, the arrangement being such that the brake shoe is automatically drawn in between the abutment and the rotary drum to have a retarding action thereon when the movement thereof takes place in one direction while in the other direction of oscillation the shoe is automatically pushed away against the action of the spring so that little frictional retardation takes place.

19. A device as claimed in claim 18, wherein the drum is provided with a mutilated portion.

20. A door closing and checking device comprising a casing, a rotary drum in the casing adapted to rotate first in one direction and then in the other, a brake shoe between which and the rotary drum relative oscillatory movement takes place consisting of an elongated wedge-shaped member, a spring connected to the brake shoe and the casing and normally tending to thrust the brake shoe against the rotary drum, and adjustable means for controlling the positioning of the brake shoe with respect to the drum, the arrangement being such that the shoe is drawn into an increasing sliding braking contact with the drum without locking against it when the movement thereof takes place in one direction, while in the other direction the shoe is automatically pushed away so that there is a minimum of frictional effect.

21. In a door checking and closing device, comprising a rotary brake drum adapted to rotate first in one direction and then in the other, a brake shoe between which and the rotary drum relative motion takes place, consisting of a wedge-shaped member adapted to afford an extended braking surface for contact with the drum which will retard rotation of the latter as distinct from producing a locking effect, the arrangement being such that the shoe is drawn into an increasing sliding braking contact with the drum without locking against it when the movement thereof takes place in one direction, while in the other direction the shoe is automatically pushed away so that there is a minimum of frictional effect.

22. In a door checking and closing device, comprising a rotary brake drum adapted to rotate first in one direction and then in the other, a brake shoe between which and the rotary drum relative motion takes place, consisting of a wedge-shaped member adapted to afford an extended braking surface for contact with the drum which will retard rotation of the latter as distinct from producing a locking effect, and an abutment between which and the drum the shoe is adapted to act, the arrangement being such that the shoe is drawn into an increasing sliding braking contact with the drum without locking against it when the movement thereof takes place in one direction, while in the other direction the shoe is automatically pushed away so that there is a minimum of frictional effect.

23. In a door checking and closing device, comprising a rotary brake drum adapted to rotate first in one direction and then in the other, a brake shoe between which and the rotary drum relative motion takes place, consisting of a wedge-shaped member adapted to afford an extended braking surface for contact with the drum which will retard rotation of the latter as distinct from producing a locking effect, an abutment between which and the drum the shoe is adapted to act, and a stop device adapted to limit the movement in the operative direction of the shoe, the arrangement being such that the shoe is drawn into an increasing sliding braking contact with the drum without locking against it, which contact may increase to the limit of the stop, when the movement thereof takes place in one direction, while in the other direction the shoe is automatically pushed away so that there is a minimum of frictional effect.

24. In a door closing and checking device, comprising a rotary brake drum adapted to rotate first in one direction and then in the other, a brake shoe between which and the rotary drum relative motion takes place, consisting of a wedge-shaped member adapted to afford an extended braking surface for contact with the drum which will retard rotation of the latter as distinct from producing a locking effect, an abutment between which and the drum the shoe is adapted to act, and an adjustable stop device adapted to provide a variable limit upon the operative position of the brake shoe, the arrrangement being such that the shoe is drawn into an increasing sliding braking contact with the drum without locking against it, which contact increases to the limit of the stop, when the movement thereof takes place in one direction, while in the other direction the shoe is automatically pushed away so that there is a minimum of frictional effect.

25. A door check comprising a brake member rotatable responsive to the closing of a door, a stationary abutment, an elongated friction wedge movably positioned between the said member and the abutment, and means for limiting the movement of the said wedge.

26. A door check comprising a rotatable brake member, an abutment, an elongated friction wedge postioned between the said member and said abutment and adapted to be drawn in between the wedge and the abutment upon rotation of the member in one direction, and pushed away therefrom upon rotation of the member in the opposite direction and means cooperating with the said wedge for limiting the movement thereof.

In testimony whereof I have signed my name to this specification.

HENRY SMITH.